Oct. 5, 1954 W. M. HAWKINS, JR 2,690,888
AIRCRAFT LANDING GEAR MECHANISM
Filed July 19, 1950 2 Sheets-Sheet 1
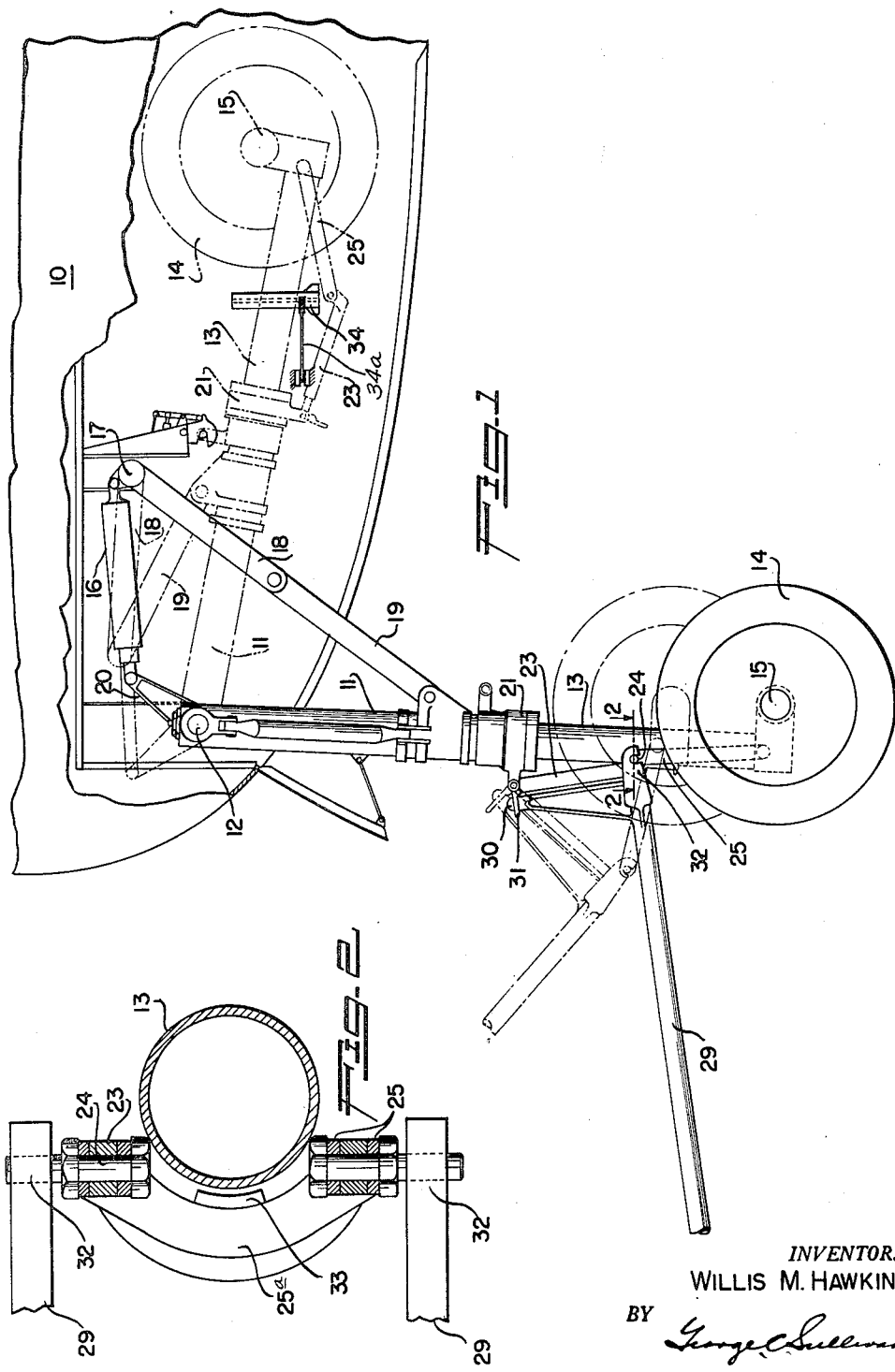
*INVENTOR.*
WILLIS M. HAWKINS JR.
BY
Agent

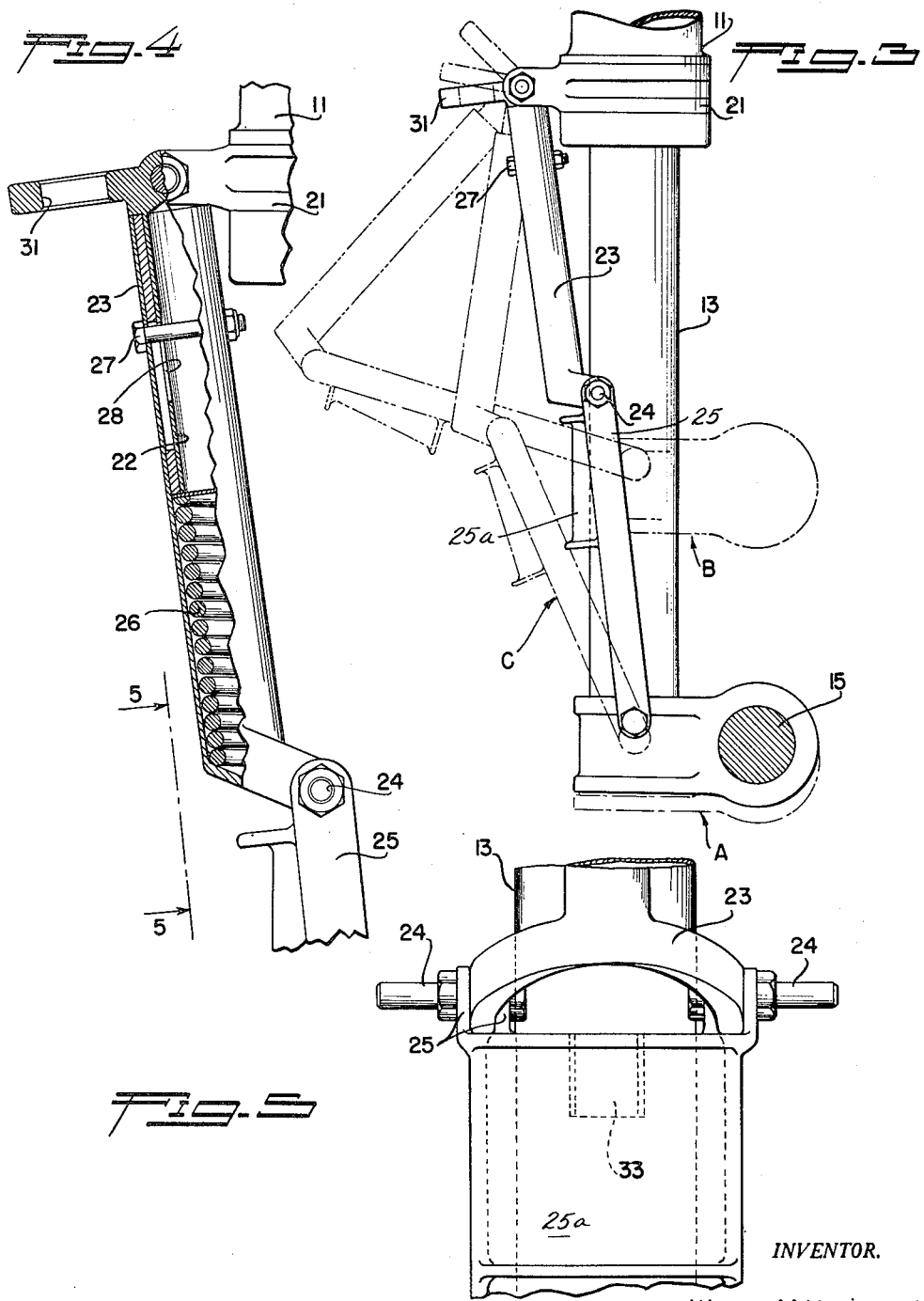

Patented Oct. 5, 1954

2,690,888

UNITED STATES PATENT OFFICE 2,690,888

AIRCRAFT LANDING GEAR MECHANISM

Willis M. Hawkins, Jr., North Hollywood, Calif., assignor to Lockheed Aircraft Corporation, Burbank, Calif.

Application July 19, 1950, Serial No. 174,646

2 Claims. (Cl. 244—102)

This invention relates to an improved nose landing gear for aircraft, which gear can be held in an extended position to elevate the nose of the aircraft to increase the angle of incidence of the wing during the take-off run.

This invention has particular reference to airplanes which are intended to be launched from a catapult, in which case the mechanism of the catapult prevents adjustment of or adequate angles of attack of airplanes equipped with conventional tricycle landing gears.

With airplanes having tricycle landing gears and designed for catapult launching, it is necessary to either permanently lengthen the nose gear or to provide a box or raised platform for the nose wheel on the catapult carriage in order to get an adequate angle of incidence for the wings so that the airplane will be airborne when released from the catapult carriage. A permanently lengthened nose gear would be undesirable since it increases the wing lift during landing run, increases the weight of the nose gear and its provisions in the airplane, and changes the normally level attitude of a tricyle gear airplane; while the box or platform on the catapult carriage also involves undesirable complications, as it must either be attached to the carriage, thus adding to the mass to be decelerated at the end of the run, or must be allowed to fly free and be retrieved in a net or some other manner. A third possibility is in wings with an adjustable angle of incidence, but the weight and complication of such an arrangement severely penalizes the airplane design and is difficult to combine with folding wings for carrier based aircraft.

It is the principal object of my invention to provide means for increasing the angle of incidence of the wing by temporarily stretching a nose gear of normal length to its approximate fully extended position when a catapult launching is desired. At other times a normal unassisted take-off can be made, and by releasing the strut from its extended position after a catapult launching normal tricycle gear landings can be made. It will be understood that a normal shock strut will be fully extended when the aircraft is airborne, but is partially compressed by the weight of the aircraft when on the ground. Landing impacts further compress the struts, and contra, the struts gradually extend as the airplane begins to become airborne upon an unassisted take-off. Even such gradual extension is impossible for catapult launchings, since in normal unassisted take-offs the pilot lifts the nose wheel off the ground with the aerodynamic controls (elevator) prior to becoming fully airborne and in catapult launchings the mechanism applies a vertical downward load to the airplane holding the nose gear and main gear compressed until the moment of release.

Other and further advantages and objects of my invention will appear in the following detailed description of an embodiment thereof, when taken in connection with the accompanying drawings, wherein:

Figure 1 is a representation of an aircraft nose landing gear embodying my invention, the gear being shown in dotted lines in its retracted position, the wheel being shown in dotted lines in its normal ground position, and in solid lines in its extended ground position;

Figure 2 is a fragmentary section on the line 2—2 of Figure 1 showing the over center stop associated with the torque scissors;

Figure 3 is an enlarged fragmentary detail showing the three basic extensions of the shock strut and the corresponding positions of the torque scissors; the extension accomplished by this invention being shown in full lines;

Figure 4 is an enlarged detail of the variable length torque scissors member, shown in its compressed position; and Figure 5 is a fragmentary front view of the torque scissors knee joints, taken from the line 5—5 of Figure 4.

As shown on the drawings, an aircraft fuselage nose section 10 is partly broken away to facilitate the showing of a nose landing gear. The nose landing gear as shown comprises an outer cylinder 11 of a shock strut, the upper end of which is pivoted at 12 in the airplane fuselage. A second cylinder or piston 13 telescopes into the cylinder 11 and carries a nose wheel 14 on an axle 15 at its lower end. When airborne and/or retracted the lower axle 15 extends to the dotted line position A in Figure 3, but when the airplane weight is on the gear the lower piston is telescoped into the outer cylinder 11 to the position B in Figure 3, which is called the static or loaded position. The strut may compress or extend from the position B due to impact or rebound, and touches down in position A, compressing the strut to position B or beyond as the airplane weight is transferred to the gear.

The landing gear, as above described, is arranged to be retracted within the envelope of the fuselage nose 10. This is accomplished by a hydraulic cylinder 16, the rear end of which has an eccentric connection to a pivotal mounting 17 which is directly connected to the upper link 18 of a drag strut, to "break" the straight line joint with a lower link 19 connected to the strut cylinder 11. The other end of the cylinder 16 connects to a lever 20 on the shock strut pivot 12. Thus when hydraulic pressure is applied to expand or lengthen the cylinder 16 one end folds up the drag links 18 and 19 and the other end retracts the whole shock strut by pivoting it into the dotted line position of Figure 1.

The structure so far described is entirely conventional and is offered as background to the description of my invention as applied thereto. It is also conventional to provide centering means for the nose wheel, as by internal cams (not shown) and/or torque scissors with conventional shimmy dampening and/or steering arrangements (also not shown). Where torque scissors have been used on a nose gear, the upper end thereof is usually attached to a collar 21 pivoted on the cylinder 11 near its lower end; which collar may be used to control shimmy and/or provide steering.

My present invention relates to a special form of torque scissors, and the combination thereof with the above described landing gear, which provides novel and important results and advantages.

The torque scissors of this invention comprise an upper link consisting of inner and outer tubes 22 and 23, the inner tube 22 being pivotally attached to the collar 21 on the strut cylinder 11. The outer tube 23 is bifurcated at its lower end and pivoted by knee bolts 24 to a bifurcated lower link 25, the upper ends of which are tied together by a curved member 25ª arranged to clear the strut piston 13, and the lower end of which is pivoted to strut piston 13. A compression spring 26 is placed inside the tube 23 and below the tube 22 and acts to extend the inner tube 22 until stopped by a through bolt 27 in the outer tube which bolt works in a slot 28 in the inner tube. Normally the spring 26 will extend the inner tube as in the dotted line positions of Figure 3; but when the torque scissors are straightened out over-center, as will next be described, the spring will be compressed so that the upper link is shortened to the position of Figure 4. The extendable link 23 is provided to prevent inadvertent over-center movement of the scissors links during normal gear down maneuvers; which might otherwise occur due to weight and inertia loads pulling on the scissors.

An operating lever 29 may be used to straighten out the torque scissors, this lever having a pin 30 engageable in an eye 31 at the upper end of the tube 23 and side hooks 32 engaging over the extended ends of the scissors knee bolts 24. An over-center stop 33 is provided on the curved member 25ª to bear against the piston 13 as shown in Figure 2, to prevent excessive movement.

With the scissors extended in the over-center position shown in solid lines in Figures 1 and 3, retraction of the gear after take-off causes the one knee bolt 24 of the torque scissors to contact a stop 34 mounted in the wheel well and braced thereto by a link 34ª, thus kicking the scissors over-center in the opposite direction to restore the normal airborne position thereof indicated by the dotted lines C in Figure 3 and the axle position A therein.

In the operation of the device of this invention the torque scissors normally will be in the position corresponding to the static position of the gear when the gear is extended with the airplane weight thereon. This is shown as the dotted line position of Figure 1 and the left hand dotted line position of Figure 3 corresponding to the axle position B therein.

When it is desired to increase the angle of incidence of the wing for catapult take-off, a crew man engages the operating lever 29 with the pin 30 engaging the eye 31 and the hooks 32 engaging the knee bolts 24 as shown in Figure 1. Bearing down on the lever 29 then straightens out the torque scissors and passes the knee joint over-center relative to a straight line, to a point where the stop 33 bears against the piston. This action stretches the loaded strut to approximately its free or extended position, compare Figure 3, and compresses the spring 26 in the upper link to prevent inadvertent reversal of the over-center position of the torque scissors. Retraction of the landing gear causes the stop 34 to release the torque scissors from the fixed over-center position so that upon subsequent extension of the gear it is in normal condition for landing and unassisted take-off. The change in incidence of the wing required for catapult take-offs is a matter of a few degrees, in one design the normal incidence relative to the ground is 2 degrees, and for catapult take-off this is increased to 5 degrees.

Having thus described my invention and the present preferred embodiment thereof, I desire to emphasize the fact that many modifications may be resorted to in a manner limited only by a just interpretation of the following claims.

I claim:

1. An airplane landing gear assembly including a telescoping shock strut including a relatively fixed cylinder and a second cylinder slidable relative thereto and torque scissors connecting the telescoping cylinders of said shock strut, said torque scissors comprising one member of fixed length connected at one end of the telescoping cylinder, and a second member of variable length connected at one end to the fixed cylinder, said members being connected together at their free ends by a pivot, said pivot being so arranged as to be capable of passing beyond a straight line alignment or over-center extended position of the torque scissors whereby the telescoping shock strut can be stretched to approximately its fully extended position when not airborne, means to retract the landing gear, and means positioned to engage the scissors during retraction of the landing gear to release said torque scissors from the over-center extended position upon retraction of said landing gear, whereby when said landing gear is again extended it may function to normally cushion the landing shock.

2. An aircraft landing gear including a shock strut comprising a relatively fixed member, a member telescoping relative to the fixed member, and a torque scissors interconnecting said members, said torque scissors comprising one leg of fixed length and a second leg of variable length, said second leg having a spring associated therewith to normally hold the leg at its extended length, said legs being respectively connected at one end to the telescoping and fixed members of the shock strut and the other ends being connected together by a pivot, said pivot being so arranged as to be capable of having the legs of said torque scissors shifted over-center whereby to hold the telescopic shock strut member extended with the scissors leg of variable length compressed against its spring when the aircraft weight rests on said landing gear and means to retract the landing gear, and trip means carried by the aircraft and arranged to release the torque scissors from the over-center position upon retraction of the landing gear.

References Cited in the file of this patent

UNITED STATES PATENTS

| Number | Name | Date |
|---|---|---|
| 1,853,232 | Schwartz | Apr. 12, 1932 |
| 2,049,209 | Level | July 28, 1936 |
| 2,374,146 | Waters | Apr. 17, 1945 |
| 2,448,064 | Wallace | Aug. 31, 1948 |
| 2,511,528 | Clark | June 13, 1950 |
| 2,538,878 | Misulis | Jan. 23, 1951 |
| 2,557,274 | Geisse | June 19, 1951 |

FOREIGN PATENTS

| Number | Country | Date |
|---|---|---|
| 565,331 | Great Britain | Nov. 7, 1944 |